(12) United States Patent
Kwon et al.

(10) Patent No.: US 7,976,985 B2
(45) Date of Patent: Jul. 12, 2011

(54) ELECTRODE ACTIVE MATERIAL FOR SECONDARY BATTERY

(75) Inventors: Ou Jung Kwon, Daejeon (KR); Yong Ju Lee, Nonsan-si (KR); Won Seok Chang, Daejeon (KR); Ki Tae Kim, Daejeon (KR); Seo Jae Lee, Daejeon (KR); Ki Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 1261 days.

(21) Appl. No.: 11/553,740

(22) Filed: Oct. 27, 2006

(65) Prior Publication Data

US 2007/0122707 A1    May 31, 2007

(30) Foreign Application Priority Data

Oct. 27, 2005    (KR) .................... 10-2005-0101806

(51) Int. Cl.
*H01M 4/58* (2010.01)
(52) U.S. Cl. .............. 429/231.95; 429/232; 429/212; 427/113
(58) Field of Classification Search .......... 429/231.95, 429/212, 113
See application file for complete search history.

(56) References Cited

U.S. PATENT DOCUMENTS

| | | |
|---|---|---|
| 5,702,845 A | 12/1997 | Kawakami et al. |
| 6,395,423 B1 | 5/2002 | Kawakami et al. |
| 6,558,438 B1 | 5/2003 | Satoh et al. |

FOREIGN PATENT DOCUMENTS

| | | |
|---|---|---|
| JP | 10-003920 | 1/1998 |
| JP | 2001297757 | 10/2001 |
| KR | 2001297757 | 10/2001 |
| KR | 10-2003-0028241 | 4/2003 |
| KR | 1020050001404 A | 1/2005 |
| TW | 200501469 A | 1/2005 |
| WO | WO 2004114439 A1 * | 12/2004 |

OTHER PUBLICATIONS

Wang et al., Lithium Insertion in Carbon-Silicon Composite Materials Produced by Mechanical Milling, Aug. 1998, J. Electrochem. Soc., 145, 2751-2758.*
Yang et al., Synthesis of Nanocrystalline SiC at Ambient Temperature through High Energy Reaction Milling, 1996, NanoStructured Materials, 7, 873-886.*
International Search Report for International Application No. PCT/KR2006/004404; filed Oct. 27, 2006, mailing date Jan. 30, 2007.
Client Office Action dated Sep. 5, 2007, no translation.

(Continued)

*Primary Examiner* — Patrick Ryan
*Assistant Examiner* — Ben Lewis
(74) *Attorney, Agent, or Firm* — Cantor Colburn LLP

(57) ABSTRACT

Disclosed is an electrode active material comprising: a core layer capable of repeating lithium intercalation/deintercalation; an amorphous carbon layer; and a crystalline carbon layer, successively, wherein the core layer comprises at least two core particles. A secondary battery comprising the same electrode active material is also disclosed. The electrode active material can inhibit variations in volume of the core layer that may occur during repeated charge/discharge cycles, since the core layer comprising at least two core particles, each core particle having an increased area that is in contact with the carbon layer coated thereon. Therefore, the battery using the electrode active material can provide improved cycle life characteristics.

20 Claims, 2 Drawing Sheets

OTHER PUBLICATIONS

Chinese Office Action for application No. 200680040272.8 dated Aug. 21, 2009.
Wang et al. "Lithium Insertion in Carbon-Silicon Composite Materials Produced by Mechanical Milling"; J. Electrochem. Soc., vol. 145, No. 8, Aug. 1998, pp. 2751-2758.
C. S. Wang et al., "Lithium Insertion in Carbon-Silicon Composite Materials Produced by Mechanical Milling", J. Electrochem. Soc., vol. 145, No. 8, Aug. 1998, pp. 2751-2758.
Zhen-Guo Yang et al., "Synthesis of Nanocrystalline SiC at Ambient Temperature through High Energy Reaction Milling", NanoStructured Materials, vol. 7, No. 8, Sep. 1996, pp. 873-886.
Office Action issued by the Taiwan Patent Office on Jun. 8, 2010; corresponding to Taiwanese Patent Application No. 95139762 (Claiming priority from Korean Patent Application No. 10-2005-0101806).

* cited by examiner

ELECTRODE ACTIVE MATERIAL FOR SECONDARY BATTERY

This application claims the benefit of the filing date of Korean Patent Application No. 10-2005-0101806, filed on Oct. 27, 2005, in the Korean Intellectual Property Office, the disclosure of which is incorporated herein in its entirety by reference.

BACKGROUND OF THE INVENTION (a) Field of the Invention

The present invention relates to an electrode active material for a secondary battery, and a secondary battery comprising the same electrode active material.

(b) Description of the Related Art

In general, a lithium secondary battery is obtained by using materials capable of lithium ion intercalation/deintercalation as a cathode and an anode, and by injecting an organic electrolyte or a polymer electrolyte between the cathode and the anode. Such a lithium secondary battery generates electric energy via redox reactions induced by the lithium ion intercalation/deintercalation at the cathode and the anode.

Currently, carbonaceous materials have been used as an electrode active material forming the anode of a lithium secondary battery. However, an electrode active material having a higher capacity is still required in order to further improve the capacity of a lithium secondary battery.

To satisfy such requirement, metals that show a higher charge/discharge capacity as compared to carbonaceous materials and are capable of forming an electrochemical alloy with lithium, such as Si, Al, etc., have been used as electrode active materials. However, such metal-based electrode active materials show a severe change in volume due to lithium intercalation/deintercalation, so that they are cracked and finely divided. Therefore, secondary batteries using such metal-based electrode active materials undergo a rapid drop in capacity during repeated charge/discharge cycles and show poor cycle life characteristics.

Japanese Laid-Open Patent No. 2001-297757 discloses an electrode active material having a structure based on an α phase comprising an element capable of lithium intercalation/deintercalation (e.g. Si) and a β phase essentially comprising an intermetallic compound or a solid solution of the above element with another element b.

However, the aforementioned electrode active materials are still insufficient in providing excellent cycle life characteristics, and thus cannot be used as practical electrode active materials for a lithium secondary battery.

SUMMARY OF THE INVENTION

Therefore, the present invention has been made in view of the above-mentioned problems. It is an object of the present invention to provide an electrode active material having high charge/discharge capacity and excellent cycle life characteristics, and a secondary battery comprising the same electrode active material. The electrode active material according to the present invention comprises a core layer capable of repeating lithium intercalation/deintercalation, and an amorphous carbon layer and a crystalline carbon layer successively formed on a surface of the core layer. Such high charge/discharge capacity and excellent cycle life characteristics are accomplished by the core layer, which comprises at least two core particles, so as to inhibit variations in volume of the core layer, such as a metal, during repeated charge/discharge cycles, and to maintain high conductivity and conduction paths among the electrode active material particles.

According to an aspect of the present invention, there is provided an electrode active material comprising: a core layer capable of repeating lithium intercalation/deintercalation; an amorphous carbon layer; and a crystalline carbon layer, successively, wherein the core layer comprises at least two core particles. A secondary battery comprising the above electrode active material is also provided.

According to another aspect of the present invention, there is provided a method for preparing the above electrode active material, the method comprising the steps of: mixing a metal or metalloid forming a core layer with crystalline carbon; and carrying out mechanical alloying of the mixture in a Mechano Fusion system in the presence of balls.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE INVENTION

Hereinafter, the present invention will be explained in more detail.

Figure 1:
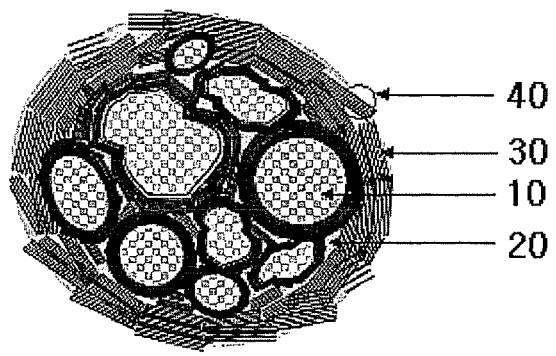
FIG. 1 is a sectional view of the electrode active material prepared according to a preferred embodiment of the present invention.

FIG. 1 is a sectional view of the electrode active material that may be prepared according to a preferred embodiment of the present invention. As shown in FIG. 1, the surface of the core layer 10 formed of an electrochemically rechargeable metal or metalloid is coated with an amorphous carbon layer 20 and a crystalline carbon layer 30, successively. The metal or metalloid core layer 10 comprises at least two metal or metalloid core particles. In other words, the metal or metalloid core layer does not comprise one metal or metalloid particle but comprises at least two metal or metalloid core particles.

The electrode active material according to the present invention can inhibit variations in volume of the core layer caused by the carbon layers coated on the core layer during charge/discharge cycles.

Additionally, as the number of core particles contained in the core layer increases, interstitial volumes present among the core particles also increase. Thus, it is possible to inhibit variations in volume of the core layer more efficiently. Since the amount of the total core particles contained in the core layer is limited, each core particle has a smaller particle size as the number of the core particles contained in the core layer increases. Further, smaller core particles result in an increase in the area of the core particles that are in contact with the carbon layers. Hence, it is possible to inhibit variations in volume of the core layer more efficiently, and to maintain electric conductivity and conduction paths among the electrode active material particles. As a result, a lithium secondary battery using the electrode active material according to the present invention provides high charge/discharge capacity and excellent cycle life characteristics.

Preferably, the crystalline carbon layer comprises sheet-like carbon layer units, and the c-axis direction of the sheet-like carbon layer units is perpendicular to the tangent direction of the electrode active material particle.

As used herein, the term sheet-like carbon layer unit (numeral 40 in FIG. 1) refers to a plurality of sheet-like carbon layers having the same c-axis direction in the crystalline carbon layer as the concept of a unit.

Because the c-axis direction of the sheet-like carbon layer units is perpendicular to the tangent direction of the particle, edge portions of each sheet-like carbon layer unit are connected closely to each other. Due to such connection, each sheet-like carbon layer unit has no edge portions exposed to the exterior. Thus, it is possible to inhibit formation of a coating film and generation of an irreversible reaction that may occur between an electrolyte and the edge portions of each sheet-like carbon layer unit exposed to the electrolyte. Therefore, the sheet-like carbon layer units forming the crystalline carbon layer can inhibit the core layer from undergoing variations in volume during repeated lithium intercalation/deintercalation.

According to a preferred embodiment of the present invention, the core particles may be formed of a metal or metalloid capable of repeating lithium intercalation/deintercalation. A metal or metalloid having a higher charge/discharge capacity is more preferred.

Particular examples of the metal or metalloid include at least one metal or metalloid selected from the group consisting of Si, Al, Sn, Sb, Bi, As, Ge and Pb, or an alloy thereof. However, any metal or metalloid capable of electrochemical and reversible lithium intercalation/deintercalation can be used with no particular limitation.

Preferably, the core particles have an average particle diameter of 0.01~50 μm. If the core particles have an average particle diameter less than 0.01 μm, they are not amenable to a mechanical alloying process. On the other hand, if the core particles have an average particle diameter greater than 50 μm, it is not possible to sufficiently inhibit variations in volume during charge/discharge cycles even though the core layer is coated successively with the amorphous carbon layer and the crystalline carbon layer.

Particular examples of the crystalline carbon include natural graphite, artificial graphite, etc., which have a high degree of graphitization. Particular examples of the graphite-based material include MCMB (MesoCarbon MicroBead), carbon fiber, natural graphite, or the like, but are not limited thereto.

Particular examples of the amorphous carbon include coal tar pitch, petroleum pitch, and carbonaceous materials obtained by heat treatment of various organic materials, but are not limited thereto.

According to a preferred embodiment of the present invention, the electrode active material comprising the core layer, the amorphous carbon layer and the crystalline carbon layer, successively, is provided in a ratio of [core layer:amorphous carbon layer:crystalline carbon layer] of 70~30 parts by weight:0.1~50 parts by weight:29.9~70 parts by weight.

If the core layer capable of repeating lithium intercalation/deintercalation is present in an amount less than 30 parts by weight, the electrode active material cannot be served as a high-capacity electrode active material due to its low reversible capacity and the core layer cannot comprise at least two core particles. If the crystalline carbon layer is present in an amount less than 29.9 parts by weight, it is not possible to obtain conductivity sufficiently. Additionally, if the amorphous carbon layer is present in an amount less than 0.1 parts by weight, it is not possible to inhibit a volume expansion sufficiently. On the other hand, if the amorphous carbon layer is present in an amount greater than 50 parts by weight, there is a possibility of degradation of capacity and conductivity.

Preferably, the amorphous carbon layer has an interlayer spacing d002 of 0.34 nm or more and a thickness of 5 nm or more. If the amorphous carbon layer has a thickness less than 5 nm, it is not possible to sufficiently inhibit variations in volume of the core layer. If the interlayer spacing is less than 0.34 nm, the amorphous carbon layer itself undergoes severe variations in volume during repeated charge/discharge cycles. Thus, it is not possible to sufficiently inhibit variations in volume of the core layer, resulting in degradation in cycle life characteristics.

Preferably, the crystalline carbon layer has an interlayer spacing d002 of 0.3354~0.35 nm. The lowest critical value is the theoretical minimum interlayer spacing of graphite, and thus any value smaller than the lowest critical value does not exist. Carbon having an interlayer spacing greater than the highest critical value has poor conductivity, so that the crystalline carbon layer using the same shows low conductivity. Thus, in this case, lithium intercalation/deintercalation cannot proceed smoothly.

Although there is no limitation in thickness of the crystalline carbon layer, the crystalline carbon layer preferably has a thickness of 1~10 microns. If the crystalline carbon layer has a thickness less than 1 micron, it is difficult to ensure sufficient conductivity among electrode active material particles. On the other hand, if the crystalline carbon layer has a thickness greater than 10 microns, proportion of the carbonaceous materials to the electrode active material is too high to obtain high charge/discharge capacity.

The electrode active material according to the present invention can be obtained by the method comprising the steps of: mixing a metal or metalloid forming a core layer with crystalline carbon; and carrying out mechanical alloying of the mixture in a Mechano Fusion system in the presence of balls. Herein, the term "mechanical alloying" refers to a process for forming an alloy having a uniform composition by applying a mechanical force.

In the first step, the metal or metalloid may be mixed with the crystalline carbon in a ratio of [metal or metalloid:crystalline carbon] of 70~30 parts by weight:30~70 parts by weight.

In the second step, the balls may be mixed with the mixture obtained from the first step in a ratio of [balls:mixture of the first step] of 50~98 parts by weight:50~2 parts by weight. If the ratio is less than 50:50, it is not possible to transfer compression stress to the mixture. On the other hand, if the ratio is greater than 98:2, the balls are used in an excessive amount, resulting in a drop in productivity.

Additionally, the balls that may be used in the second step include stainless steel balls or zirconia balls having a diameter of 0.1~10mm.

The electrode according to the present invention may be manufactured by a conventional method known to those skilled in the art. For example, the electrode active material according to the present invention may be mixed with a binder and a solvent, and optionally with a conductive agent and a dispersant, and the mixture is agitated to provide slurry. Then, the slurry is applied onto a metal collector, and the collector coated with the slurry is compressed and dried to provide an electrode.

The binder and the conductive agent may be used in an amount of 1~10 parts by weight and 1~30 parts by weight, respectively, based on the weight of the electrode active material.

Particular examples of the binder that may be used in the present invention include polytertrafluoroethylene (PTFE), polyvinylidene fluoride (PVdF), or the like.

In general, the conductive agent that may be used in the present invention includes carbon black. Commercially available conductive agents include acetylene black-based conductive agents (available from Chevron Chemical Company or Gulf Oil Company), Ketjen Black EC series (available from Armak Company), Vulcan XC-72 (available from Cabot Company) and Super P (available from MMM Co.) The metal collector includes a metal with high conductivity. Any metal to which the electrode active material slurry can be adhered with ease can be used as long as it shows no reactivity in the drive voltage range of a battery using the same. Typical examples of the collector include mesh, foil, etc., obtained from aluminum, copper, gold, nickel, aluminum alloy or a combination thereof.

Also, there is no particular limitation in methods of applying the slurry onto the collector. For example, the slurry may be applied onto the collector via a doctor blade coating, dip coating or brush coating process. There is no particular limitation in the amount of the slurry applied onto the collector. However, it is preferred that the slurry is applied in such an amount that the active material layer formed after removing a solvent or a dispersant can be in a range of generally 0.005~5 mm, and preferably 0.05~2 mm.

Further, there is no particular limitation in methods of removing the solvent or the dispersant. However, it is preferred that the solvent or the dispersant is allowed to evaporate as quickly as possible, provided that no cracking occurs in the active material layer due to stress concentration and no separation occurs between the active material layer and the collector. For example, the collector coated with the active material slurry may be dried in a vacuum oven at 50~200° C. for 0.5~3 days.

The secondary battery according to the present invention can be manufactured by using the electrode active material of the present invention according to a conventional method known to those skilled in the art. For example, the secondary battery may be obtained by interposing a porous separator between a cathode and an anode to form an electrode assembly, and then by injecting an electrolyte thereto. The secondary battery includes a lithium ion secondary battery, a lithium polymer secondary battery or a lithium ion polymer secondary battery.

The electrolyte may comprise a non-aqueous solvent and an electrolyte salt.

Any non-aqueous solvent currently used for a non-aqueous electrolyte may be used with no particular limitation. Particular examples of such non-aqueous solvents include cyclic carbonates, linear carbonates, lactones, ethers, esters, and/or ketones.

Particular examples of the cyclic carbonates include ethylene carbonate (EC), propylene carbonate (PC), butylene carbonate (BC), or the like. Particular examples of the linear carbonates include diethyl carbonate (DEC), dimethyl carbonate (DMC), dipropyl carbonate (DPC), ethylmethyl carbonate (EMC), methyl propyl carbonate (MPC), or the like. Particular examples of the lactone include gamma-butyrolactone (GBL). Particular examples of the ether include dibutyl ether, tetrahydrofuran, 2-methyltetrahydrofuran, 1,4-dioxane, 1,2-dimethoxyethane, or the like. Additionally, particular examples of the ester include methyl acetate, ethyl acetate, methyl propionate, methyl pivalate, or the like. Further, particular examples of the ketone include polymethylvinyl ketone. Such non-aqueous solvents may be used alone or in combination.

Any electrolyte salt currently used for a non-aqueous electrolyte may be used in the present invention with no particular limitation. Non-limiting examples of the electrolyte salt include a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $CF_3SO_3^-$, $N(CF_3SO_2)_2^-$, $C(CF_2SO_2)_3^-$ and combinations thereof. A lithium salt is particularly preferred. Such electrolyte salts may be used alone or in combination.

The secondary battery according to the present invention may further comprise a separator. Although there is no particular limitation in the separator that may be used in the present invention, it is preferable to use a porous separator. Non-limiting examples of the separator that may be used include a polypropylene-based, polyethylene-based or polyolefin-based porous separator.

There is no particular limitation in the outer shape of the secondary battery according to the present invention. The secondary battery may be a cylindrical battery using a can, a prismatic battery, a pouch-type battery or a coin-type battery.

Reference will now be made in detail to the preferred embodiments of the present invention. It is to be understood that the following examples are illustrative only and the present invention is not limited thereto.

EXAMPLE 1

Si was mixed with natural graphite in a ratio of 50 parts by weight:50 parts by weight to provide a mixture, and stainless steel balls having a diameter of 3 mm and the mixture were introduced into a Mechano Fusion system available from Hosokawa Micron Co. in a weight ratio of 5:1. Next, the resultant mixture was subjected to mechanical alloying at a rotation speed of 600 rpm for 30 minutes to provide an electrode active material having a core layer comprising at least two core particles, an amorphous carbon layer and a crystalline carbon layer.

Then, 100 parts by weight of the electrode active material powder obtained as described above, 10 parts by weight of PVDF as a binder and 10 parts by weight of acetylene black as a conductive agent were mixed, NMP was further added to the above mixture as a solvent, and then the resultant mixture was mixed thoroughly to provide uniform slurry. Next, the slurry was coated onto copper foil with a thickness of 20 micron, followed by drying and rolling. The coated foil was cut into a desired size via punching to provide an electrode.

As an electrolyte, a non-aqueous solvent comprising ethylene carbonate (EC) and ethyl methyl carbonate (EMC) in a ratio of 1:2 (v:v) and containing 1M $LiPF_6$ dissolved therein was used.

The electrode obtained as described above was used as an anode and lithium metal was used as a counter electrode. Then, a polyolefin-based separator was interposed between both electrodes and the electrolyte was injected thereto to provide a coin-type battery according to the present invention.

EXAMPLE 2

A battery was provided in the same manner as described in Example 1, except that Si was mixed with natural graphite in a ratio of 50 parts by weight:50 parts by weight to provide a mixture, zirconia balls having a diameter of 5 mm and the mixture were introduced into a Mechano Fusion system available from Hosokawa Micron Co. in a weight ratio of 10:1, and then the resultant mixture was subjected to mechanical alloying at a rotation speed of 600 rpm for 30 minutes to provide an electrode active material having a core layer comprising at least two core particles, an amorphous carbon layer and a crystalline carbon layer.

COMPARATIVE EXAMPLE 1

A battery was provided in the same manner as described in Example 1, except that Si was mixed with natural graphite in a ratio of 20 parts by weight:80 parts by weight to provide a mixture, stainless steel balls having a diameter of 3 mm and the mixture were introduced into a Mechano Fusion system available from Hosokawa Micron Co. in a weight ratio of 5:1, and then the resultant mixture was subjected to mechanical alloying at a rotation speed of 600 rpm for 30 minutes to provide an electrode active material having a core layer comprising one core particle, an amorphous carbon layer and a crystalline carbon layer.

COMPARATIVE EXAMPLE 2

A battery was provided in the same manner as described in Example 1, except that Si was mixed with natural graphite in a ratio of 20 parts by weight:80 parts by weight to provide a mixture, zirconia balls having a diameter of 5 mm and the mixture were introduced into a Mechano Fusion system available from Hosokawa Micron Co. in a weight ratio of 10:1, and then the resultant mixture was subjected to mechanical alloying at a rotation speed of 600 rpm for 30 minutes to provide an electrode active material having a core layer comprising one core particle, an amorphous carbon layer and a crystalline carbon layer.

Experimental Results 1

Figure 2:
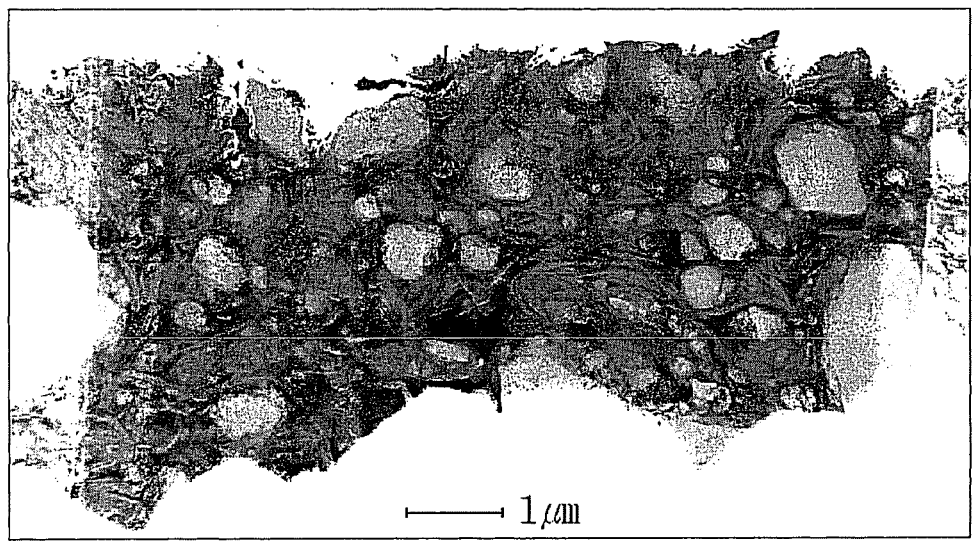
FIG. 2 is a photographic view of the section of the electrode active material according to Example 1, taken by STEM HAADF (scanning transmission electron microscopy-high angle annular dark field)

The electrode active material prepared in Example 1 was observed for its section by using STEM HAADF. The results are shown in FIG. 2. In FIG. 2, white particles are silicon particles, the black wave pattern around the silicon particles represents a crystalline carbon layer, and the black part between the silicon particles and the black wave pattern represents an amorphous carbon layer. Therefore, it can be seen from the results that the core layer (silicon) is coated with the amorphous carbon layer and the crystalline carbon layer, successively, and the core layer comprises at least two core particles.

Experimental Results 2

Each of the batteries according to Examples 1 and 2 and Comparative Examples 1 and 2 was subjected to three charge/discharge cycles, and measured for variations in volume. As shown in the following Table 1, the battery according to Example 1 shows a variation in volume of about 51% (33 μm→50 μm), while the battery according to Comparative Example 1 shows a variation in volume of about 89% (27 μm→51 μm). This indicates that the electrode active material according to the present invention has an effect of inhibiting a volume expansion.

Figure 3:
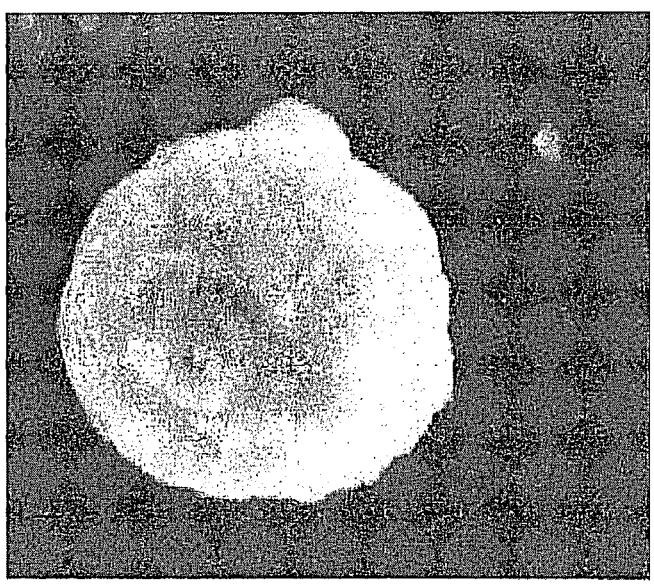
FIG. 3 is a photographic view of the surface of the electrode active material according to Example 2, taken by SEM before the electrode active material is subjected to charge/discharge cycles.
Figure 4:
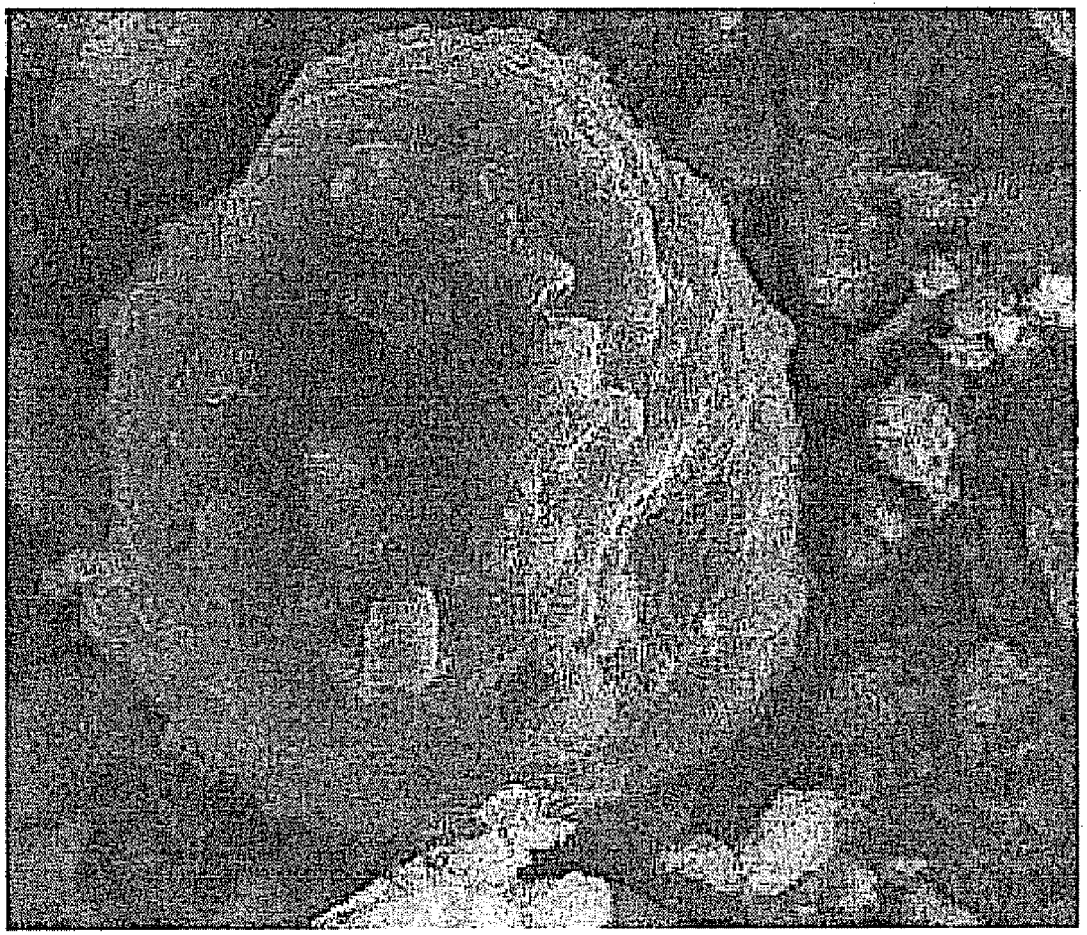
FIG. 4 is a photographic view of the surface of the electrode active material according to Example 2, taken by SEM after the electrode active material is subjected to fifty charge/discharge cycles.

In addition, each of the batteries obtained by using the electrode active materials according to Examples 1 and 2 shows little variation in volume of the core layer after being subjected to charge/discharge cycles. As shown in the following Table 1, each battery maintains the initial capacity to a ratio of 98% or more even after fifty charge/discharge cycles (see Table 1 and FIGS. 3 and 4). On the contrary, each of the batteries obtained by using the electrode active materials according to Comparative Examples 1 and 2, which comprise a core layer including one core layer, an amorphous carbon layer and a crystalline carbon layer, shows degradation in cycle life characteristics when compared to the batteries according to Examples 1 and 2.

TABLE 1

| | Discharge capacity maintenance after 50 cycles (%) | Initial electrode thickness (μm) | Electrode thickness after 3 charge/discharge cycles (μm) | Electrode expansion ratio (%) ($\Delta t/t_i$) |
|---|---|---|---|---|
| Ex. 1 | 99.3 | 33 | 50 | 51 |
| Ex. 2 | 98.1 | 35 | 56 | 60 |
| Comp. Ex. 1 | 80.7 | 27 | 51 | 89 |
| Comp. Ex. 2 | 78.2 | 28 | 54 | 93 |

As can be seen from the foregoing, the electrode active material according to the present invention can inhibit variations in volume of the core layer that may occur during repeated charge/discharge cycles, since the core layer comprises at least two core particles, each core particle having an increased area that is in contact with the carbon layer coated thereon. Therefore, the battery using the electrode active material according to the present invention can provide improved cycle life characteristics.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. An electrode active material comprising: a core layer; an amorphous carbon layer; and a crystalline carbon layer, successively, wherein the core layer comprises at least two core particles, and lithium ions repeatedly intercalate into and deintercalate from the core layer.

2. The electrode active material according to claim 1, wherein the core particles comprise at least one of a metal and a metalloid, and lithium ions repeatedly intercalate into and deintercalate from the at least one of the metal and the metalloid of the core layer.

3. The electrode active material according to claim 1, wherein the core particles comprise at least one material selected from the group consisting of Si, Al, Sn, Sb, Bi, As, Ge and Pb.

4. The electrode active material according to claim 1, wherein an average particle diameter of the core particles is in a range of 0.01-50 μm.

5. The electrode active material according to claim 1, wherein the crystalline carbon layer comprises sheet-like carbon layer units, and c-axis direction of the sheet-like carbon layer units is perpendicular to tangent direction of a electrode active material particle.

6. The electrode active material according to claim 1, wherein the core layer, the amorphous carbon layer and the crystalline carbon layer are in a ratio of [core layer:amorphous carbon layer:crystalline carbon layer] of 70-30 parts by weight:0.1-50 parts by weight:29.9-70 parts by weight.

7. The electrode active material according to claim 1, wherein the crystalline carbon layer has an interlayer distance d002 in a range of 0.3354-0.35 nm and a thickness in a range of 1-10 microns.

8. The electrode active material according to claim 1, wherein the amorphous carbon layer has an interlayer distance d002 equal to or greater than 0.34 nm, and a thickness equal to or greater than 5 nm.

9. A secondary battery comprising an electrode active material,
wherein the electrode active material comprising: a core layer; an amorphous carbon layer; and a crystalline carbon layer, successively, wherein the core layer comprises at least two core particles, and lithium ions repeatedly intercalate into and deintercalate from the core layer.

10. The secondary battery according to claim 9, wherein the core particles comprise at least one of a metal and a metalloid, and lithium ions repeatedly intercalate into and deintercalate from the at least one of the metal and the metalloid of the core layer.

11. The secondary battery according to claim 9, wherein the core particles comprise at least one material selected from the group consisting of Si, Al, Sn, Sb, Bi, As, Ge and Pb.

12. The secondary battery according to claim 9, wherein the crystalline carbon layer comprises sheet-like carbon layer units, and c-axis direction of the sheet-like carbon layer units is perpendicular to tangent direction of a electrode active material particle.

13. The secondary battery according to claim 9, wherein the core layer, the amorphous carbon layer and the crystalline carbon layer are in a ratio of [core layer:amorphous carbon layer:crystalline carbon layer] of 70-30 parts by weight:0.1-50 parts by weight:29.9-70 parts by weight.

14. The secondary battery according to claim 9, wherein the crystalline carbon layer has an interlayer distance d002 in a range of 0.3354-0.35 nm and a thickness in a range of 1-10 microns.

15. The secondary battery according to claim 9, wherein the amorphous carbon layer has an interlayer distance d002 equal to or greater than 0.34 nm, and a thickness equal to or greater than 5 nm.

16. A method for preparing an electrode active material comprising: a core layer; an amorphous carbon layer; and a crystalline carbon layer, successively, wherein the core layer comprises at least two core particles, and lithium ions repeatedly intercalate into and deintercalate from the core layer, the method comprising:
mixing at least one of a metal and a metalloid, which forms the core layer, with crystalline carbon; and
carrying out mechanical alloying of a mixture obtained from the mixing by introducing the mixture and balls into a Mechano Fusion system.

17. The method according to claim 16, wherein the at least one of the metal and the metalloid and the crystalline carbon are mixed in the mixing in a ratio of [at least one of the metal and the metalloid:crystalline carbon] of 70-30 parts by weight:30-70 parts by weight.

18. The method according to claim 16, wherein the balls and the mixture obtained from the mixing are mixed in the carrying out the mechanical alloying in a ratio of [balls: mixture obtained from the mixing] of 50-98 parts by weight: 50-2 parts by weight.

19. The method according to claim 16, wherein the balls used in the carrying out the mechanical alloying include at least one of stainless steel balls and zirconia balls.

20. The method according to claim 16, wherein diameters of the balls used in the carrying out the mechanical alloying are in a range of 0.1-10 mm.

* * * * *